United States Patent [19]

Toumayan et al.

[11] Patent Number: 4,651,307

[45] Date of Patent: Mar. 17, 1987

[54] NON-VOLATILE MEMORY STORAGE SYSTEM

[75] Inventors: Burton B. Toumayan, Chicago, Ill.; Scott T. Christians, Buda, Tex.

[73] Assignee: Motorola, Inc., Schaumburg, Ill.

[21] Appl. No.: 667,039

[22] Filed: Nov. 1, 1984

[51] Int. Cl.⁴ .............................................. G11C 13/00
[52] U.S. Cl. ..................................... 365/228; 365/226; 365/189
[58] Field of Search ................. 365/228, 226, 189, 230

[56] References Cited

U.S. PATENT DOCUMENTS

3,916,390 10/1975 Chang et al. ........................ 365/228
3,950,737 4/1976 Uchida et al. ........................ 365/228

Primary Examiner—Terrell W. Fears
Attorney, Agent, or Firm—Steven G. Parmelee

[57] ABSTRACT

A non-volatile memory storage system having non-volatile memory (10) and volatile memory. The non-volatile memory (10) will have its most significant bits memory locations (11) periodically updated in response to a growing count of data. The least significant bits information reflecting such count will be maintained in volatile memory except during power down conditions. During power down conditions, the least significant bits will be stored in a separate plurality of memory locations (12) contained in the non-volatile memory (10).

13 Claims, 6 Drawing Figures

NON-VOLATILE MEMORY STORAGE SYSTEM

TECHNICAL FIELD

This invention relates generally to storage systems suitable for use with non-volatile memory. The invention has particular application in settings where an increasing count of a high number of incremental pulses must be stored, as occurs with an automobile odometer.

BACKGROUND ART

With the increased acceptance of and demand for electronic display and information systems, as in automobiles, systems designers have been confronted with a variety of problems. Some of these problems relate to providing data output in a form most useful to the viewer, and others relate simply to asthetic issues. One problem in particular, however, has presented a more serious issue because it touches upon both state and federal legal restrictions and requirements; the provision of an electronic odometer.

The task of the vehicle odometer can be described easily enough. The odometer must accurately measure and report the total distance the monitored vehicle has ever been driven. This information will be relied upon by maintenance personnel and by potential purchasers of the vehicle. An odometer that fails to accurately measure travelled distance, or that fails to accurately report this distance, can contribute to incorrect decisions by these persons.

Current mechanical odometers meet these needs by providing geared members that turn in accordance with a calibrated schedule that relates to the distance being travelled by the vehicle. Simply stated, when the vehicle moves, the gears turn and the odometer count advances. When the vehicle does not move, the gears do not move and the odometer readout remains quiescent though viewable.

Various solutions have been provided to allow the distance travelled by a vehicle to be electronically monitored. Similarly, a variety of display mechanisms are available to allow the odometer reading to be viewed. The problem with providing an electronic odometer, however, centers upon the memory mechanism. More particularly, many electronic memory units require the continued presence of electricity in order to support their storage function. Upon removing such electricity, the contents in memory are lost. Although such memory units can be supported by the vehicle battery, such batteries occasionally run down or must be disconnected to be replaced. At such times, the memory contents would be lost.

Some memory units, such as read only memory units (ROM's), are not susceptible to such a loss of memory upon disconnection of power. Unfortunately, such memory units cannot have information input into them except during the manufacturing process. Such memory units would therefore have obvious drawbacks in an odometer setting.

There are other memory units, known as EE PROMS (for electrically erasable programmable read only memory), that provide non-volatile memory and that avoid these problems. These memory units will retain their contents in memory even in the absence of electric power. Further, these memory units can have specific memory locations selectively erased and re-written to during use by simply providing appropriate signals from a control unit, such as a microprocessor.

Unfortunately, even EEPROMS have a problem associated with their use; they can wear out. More particularly, each memory location has an expected erase/write cycle lifetime of 10,000 erase/write events. Since an odometer memory must have information regarding distance travelled entered into it on a highly regular basis (to ensure accuracy), the number of anticipated erase/write cycles can outstrip the expected lifetime of the memory unit.

To compensate for this, some prior art systems use EEPROMS for storing information regarding the most significant bits of a particular count, and volatile memory for storing information regarding the least significant bits. By this compromise, EEPROM usage can be minimized to acceptable levels. Unfortunately, least significant bits data can be lost from time to time, and this can contribute to inaccuracy.

There therefore exists a need for a non-volatile memory storage system that provides a non-volatile memory that may be satisfactorily utilized in an odometer setting, and that will meet specified needs for accuracy and anticipated lifetime.

SUMMARY OF THE INVENTION

The above needs are substantially met by provision of the non-volatile memory storage system disclosed in this specification. The system comprises a method of storing information in a non-volatile memory such as an EEPROM to both assure that regular and appropriate updates to the information base are provided and that non-volatile memory locations are utilized in a power-down situation for storing least significant bits information.

Pursuant to one embodiment, odometer data can be generated, according to well understood prior art techniques, as a series of electric pulses that relate to distance travelled. Here, it may be presumed that 8,000 such pulses are provided per mile travelled. Odometer values can be stored through use of this system in units of 0.02 miles, with 160 pulses equaling each 0.02 mile, thereby providing acceptable incremental accuracy.

Twenty-four bits of memory space are utilized to store an entire odometer entry. These twenty four bits are subdivided into three one-byte entries of eight bits each. The first byte contains the most significant bits, the second byte contains the next most significant bits, and the third byte contains the least significant bits. With increments of 0.02 miles as indicated above, the third byte can represent up to 5.1 miles of travel, the second byte can represent up to 1,310.7 miles of travel, and the first byte can represent up to 335,544.3 miles of travel.

Pursuant to this method, a first and second plurality of memory locations are provided in a non-volatile memory, and a third memory location is provided in volatile memory, such as RAM. The first plurality of memory locations may be comprised of eight discrete sixteen-bit word locations that are accessable only pursuant to a pre-established closed-loop sequence and that are used to store most significant bits information regarding the odometer reading. This includes the first and second byte of data described above, which are stored in a cascaded format. The second plurality of memory locations may be comprised of four discrete sixteen-bit word locations that are used to store least significant bits information regarding the odometer reading. This includes the third byte of data described above.

Each one of the words in the second plurality is linked to two of the memory locations in the first plurality, to avoid the need for pointers or other instructions that would appropriate memory space. Finally, the third memory location includes at least one or more eight-bit words that are used to store least significant bit information regarding the odometer reading during normal operation of the system.

During use, every 160 pulses of distance data will cause the third byte as stored in the third memory location to be incremented by one. Upon reaching 5.12 miles, this third byte carries over to increment the second byte located in the first plurality of memory locations by one. This second byte can store up to 1,310.7 miles of travel, and upon exceeding this value, the first byte as also contained in the first plurality of memory locations will be incremented by one.

In general, then, the system operates as follows. As the vehicle being monitored travels, pulses are generated by the electronic transducer employed. These pulses are detected and measured by a pulse detection and counting unit (in accordance with well understood prior art techniques), and every 160 pulses, the least significant bits stored in the third memory location will be incremented by one. When the storage capacity of the third memory location has been exceeded, the next most significant bits information contained in the first plurality of memory locations will be incremented in accordance with the following steps.

First, the system will ensure that the first plurality of memory locations currently contains an accurate history of immediate past odometer readings. To accomplish this, the eight memory locations in the first plurality will be read pursuant to a pre-established closed-loop sequence. The values contained in each memory location will then be compared in order to locate the three highest entries that are separated from one another by one increment. These three entries are then presumed to be the most recent entry, the second most recent entry and the third most recent entry, and their presence allows a determination to be made that the apparatus and system are operating properly and that the odometer memory does indeed contain an accurate figure. The system then locates the next available memory location in sequence beyond the most recent entry. Once this location has been found, the most currently incremented most significant bits information will be stored therein.

Following this storage, the system will immediately read this figure and compare it with the current value to assure that the number has been accurately stored. If so, the system returns to normal operation. If the number has not been properly stored, the system will temporarily mask that memory location, and proceed to the next available memory location in the first plurality as dictated by the pre-established sequence. This process will be repeated until either an appropriate memory location has been found or until the system can confirm that no such memory location exists. In the case of the latter condition the operator will be notified that the odometer memory system has failed.

As noted above, the least significant bits information are stored in volatile memory during normal operation of the system. During normal powerdown conditions of an automobile, the system detects the powerdown and interrupts the normal operation of the system to cause the least significant bits information then stored in the volatile memory to be transferred to a memory location in the second plurality of memory locations that is properly associated with the then current most significant bits odometer reading.

In order to further enhance accuracy, the least significant bits data is entered in duplicate into the sixteen-bit memory location selected. Upon reapplication of power, and after selecting the three highest values as described above, the system will read both values and compare them with one another. If both values are the same, a presumption can be made that the number was properly entered. If the numbers do not agree, then the system will average both numbers and utilize the resulting figure.

This system provides a number of advantages over prior art storage techniques. Through use of this system, each memory location in non-volatile memory will experience less than 10,000 erase/write events even though during normal powerdown scenarios all odometer information will be secured.

Therefore, through use of this system, a fully electric odometer can be provided for an automobile that meets both the required needs of accuracy and the limitations of currently existing non-volatile memory technology.

BRIEF DESCRIPTION OF THE DRAWINGS

These and other attributes of the invention will become more clear upon a thorough review and study of the following description of the best mode for carrying out the invention, particularly when reviewed in conjunction with the drawings, wherein:

FIG. 3b comprises a continuation of the flow-chart depiction set forth in FIG. 3a.

BEST MODE FOR CARRYING OUT THE INVENTION

The non-volatile memory storage system disclosed in this specification has particular use for electronic odometers as may be utilized in electronic displays and information systems as utilized on many vehicles. The system has particular applicability for use with systems wherein the distance travelled by the vehicle being monitored gives rise to a series of electric pulses that relate in number to the actual distance travelled. These pulses constitute an incremently increasing data base that, when accurately counted, will reflect the total distance travelled by the vehicle.

In order to effectuate this system, both volatile and non-volatile memory units may be utilized, which memory units may be read and written to by an appropriate microprocessor, such as an MC6805R3 as manufactured by Motorola, Inc. The volatile memory may be provided as an onboard feature of the microprocessor, and the non-volatile memory may be provided through use of a COP494E EEPROM as manufactured by National Semiconductor Corporation.

Figure 1:
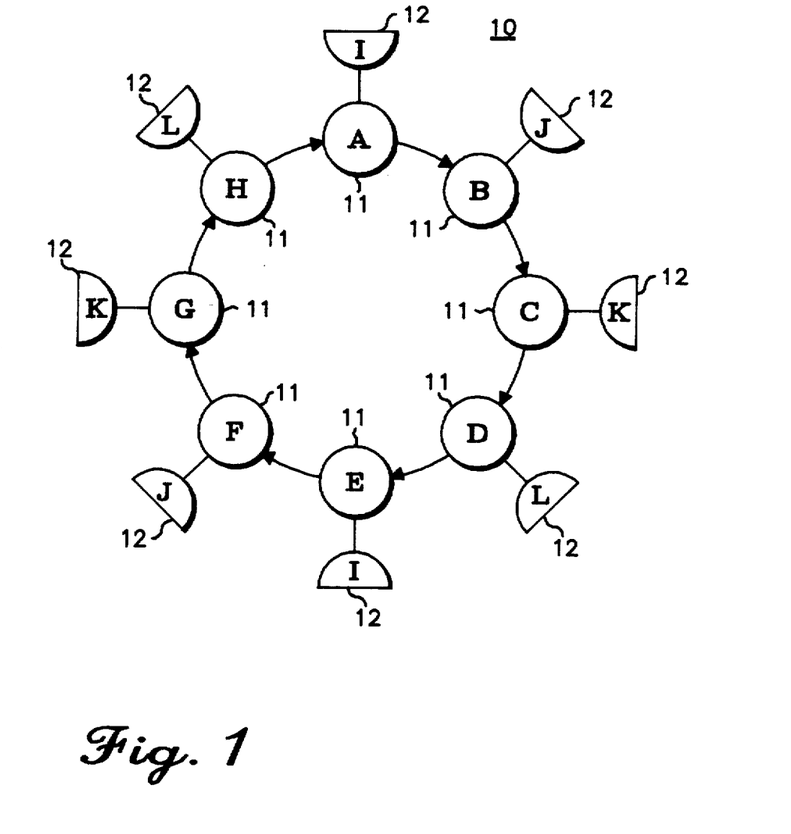
FIG. 1 comprises a diagramatic view of the first and second plurality of memory locations.

The system's treatment of the non-volatile memory can best be explained by referring to FIG. 1, wherein a diagramatic depiction of the memory locations being utilized in the non-volatile memory are represented generally by the numeral 10. The non-volatile memory (10) has been subdivided between a first plurality of memory locations (11) which are shown lettered A through H and a second plurality of memory locations (12) as lettered I through L. Each memory location (11) in the first plurality of memory locations contains 16 bits of binary information storage space. Each memory location (12) in the second plurality of memory locations also contains 16 bits, with each memory location in the second plurality being associated with two of the memory locations (11) in the first plurality. Therefore, the memory location designated by the letter I in the second plurality of memory locations is associated with both of the memories labeled A and E in the first plurality.

Figure 2:
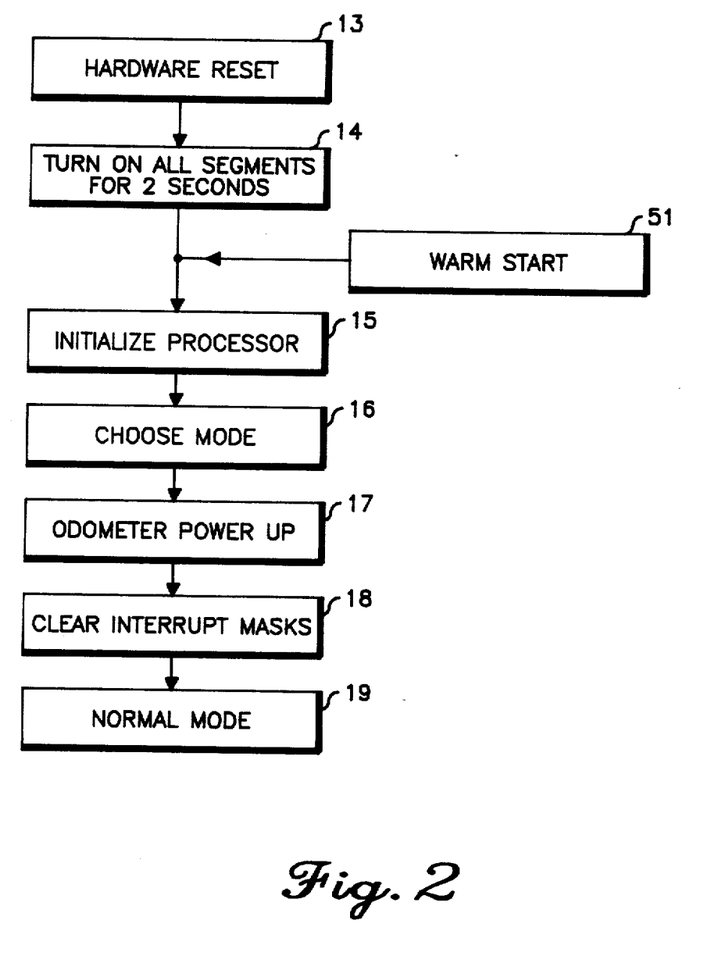
FIG. 2 comprises a flow-chart depiction.

Referring to FIG. 2, a flow-chart depiction can be seen that presumes operation of this system in an automotive setting wherein a number of electronic displays and information systems are being provided for, such as speed, tachometer, fuel quantity remaining and the like. With continued reference to FIG. 2, such a system will ordinarily initiate with a hardware reset (13) during which power is provided to the various components of the apparatus. Following this application of power, the apparatus will react by momentarily turning on all display features so that an operator can review them and determine that all display features are operable.

Following this, the primary program controlling the electronic displays and information systems may be initiated (15), and an appropriate operating mode chosen (16). The odometer will then be initiated (17) pursuant to a power up sub-routine that will be described below in more detail with respect to FIG. 5.

Finally, various interrupt masks will be cleared (18) and a normal sequence of operating instructions will occur (19) such that the various sub-routines providing for information receipt, processing and display for the various systems being monitored can be attended to. One of these features will of course include the receipt of pulses indicating distrance travelled, and the processing, storage and display of this information as odometer mileage.

Figure 3A:
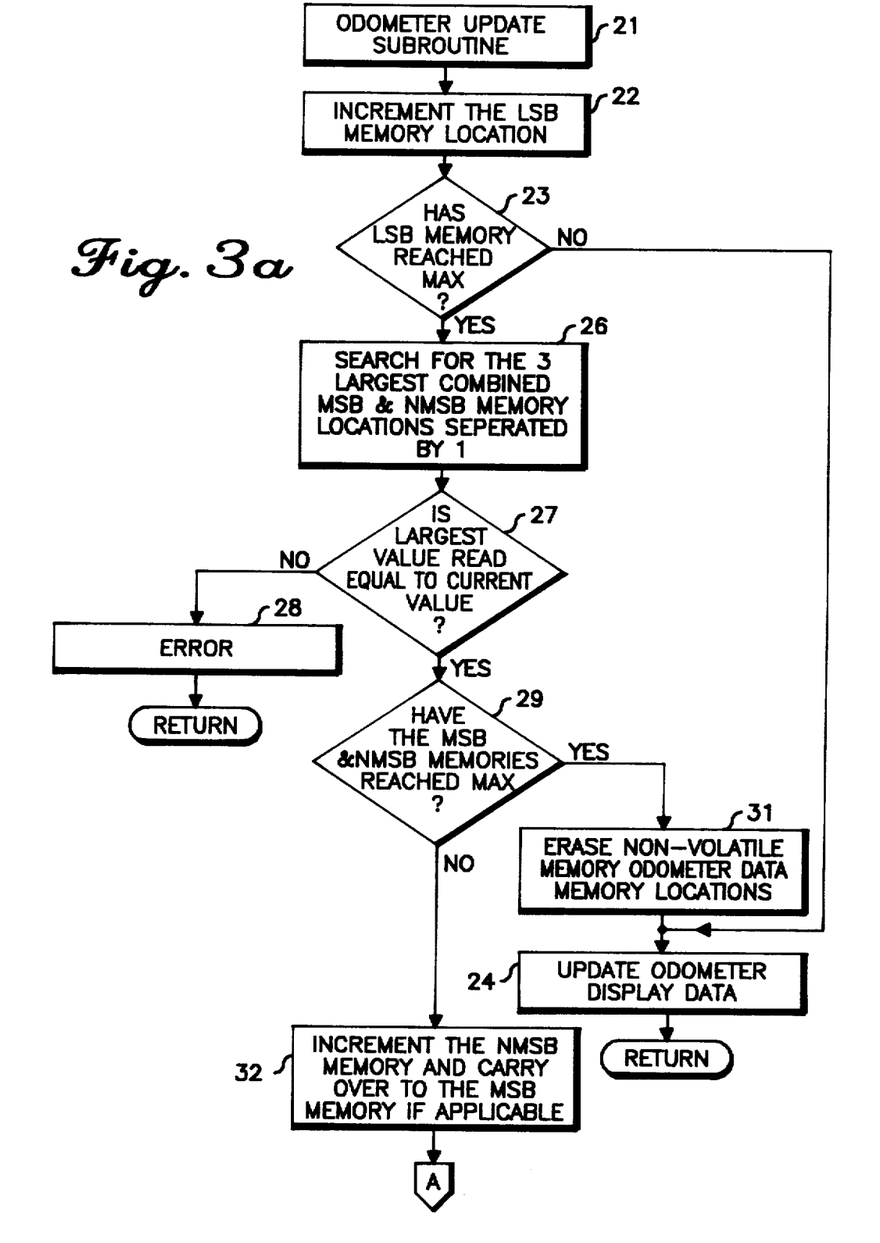
FIG. 3a comprises a flow-chart depiction.
Figure 3B:
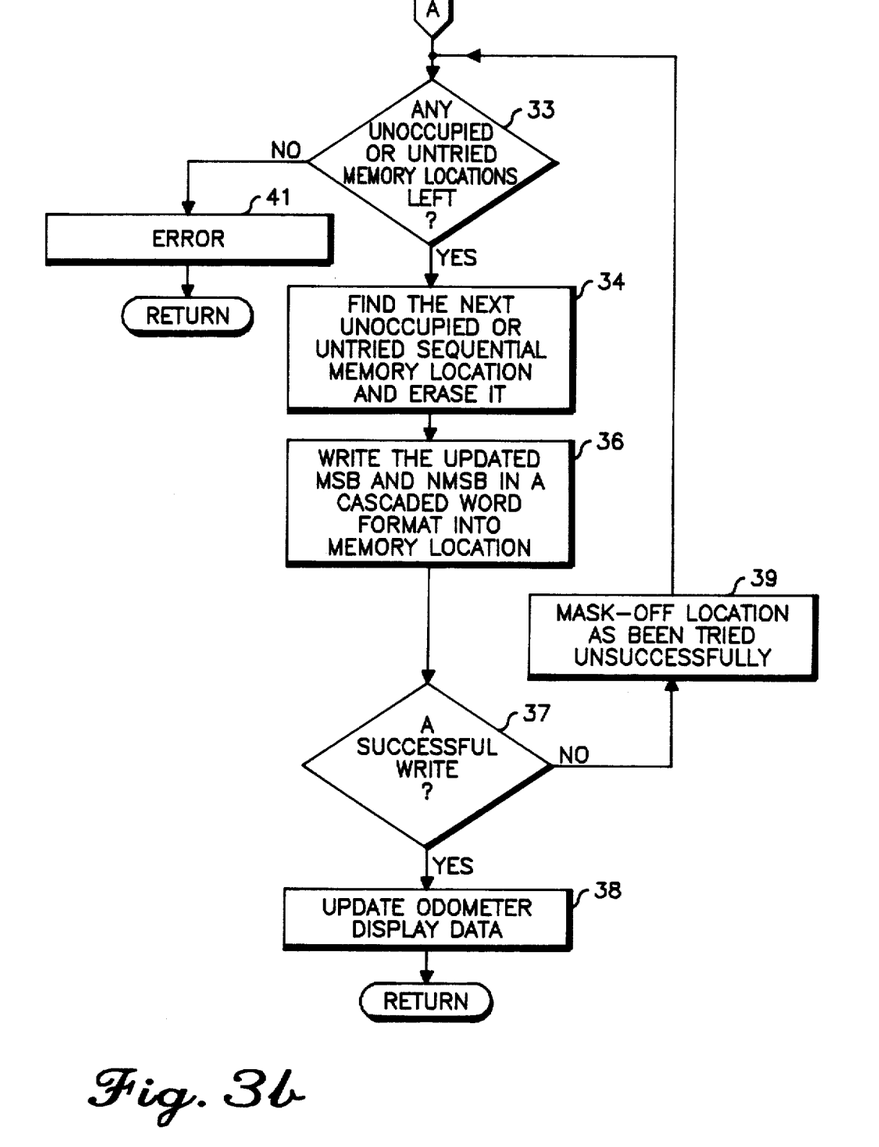

Referring to FIG. 3, the odometer update sub-routine (21) will now be described. The odometer update sub-routine begins by incrementing the least significant bits memory location in the volatile memory location (22) for each sensed 160 pulses. Following this, a determination will be made as to whether the storage capabilities of the least significant bits memory location has been exceeded (23). If not, then the odometer display need only be updated (24) and the sub-routine will return to the primary program in the normal operating mode (19) (22).

If, however, the memory location for the least significant bits has reached its maximum storage capabilities, then the memory locations (11) for the most significant bits in the first plurality of memory locations in the non-volatile memory (10) will be searched to locate the three highest stored values that are separated by one increment. If these three values can be found, then a presumption can be made that the non-volatile memory (10) currently retains an accurate history of odometer readings, and that the information contained therein can be relied upon. Presuming that these three values can be found, a determination will next be made as to whether the largest value so identified equals the current value as stored in volatile memory for display purposes (27). If not, an error signal will be displayed (28) and the system will be returned to the normal operating sequence (19) (FIG. 2) to ensure that the remaining electronic displays and information systems are not impaired.

Presuming that the largest value so obtained does equal the current value as stored in volatile memory, a determination will be made as to whether the most significant bits information memory locations (including the most significant bits and the next most significant bits) contained in the first plurality of memory locations have reached their maximum storage capacity (29). If they have, then all of the memory locations in the non-volatile memory will be erased (31) and the odometer display will be updated accordingly (24).

Otherwise, the next most significant bits byte will be incremented and, if applicable, the most significant bits byte will be carried over and incremented as well (32).

Figure 4:
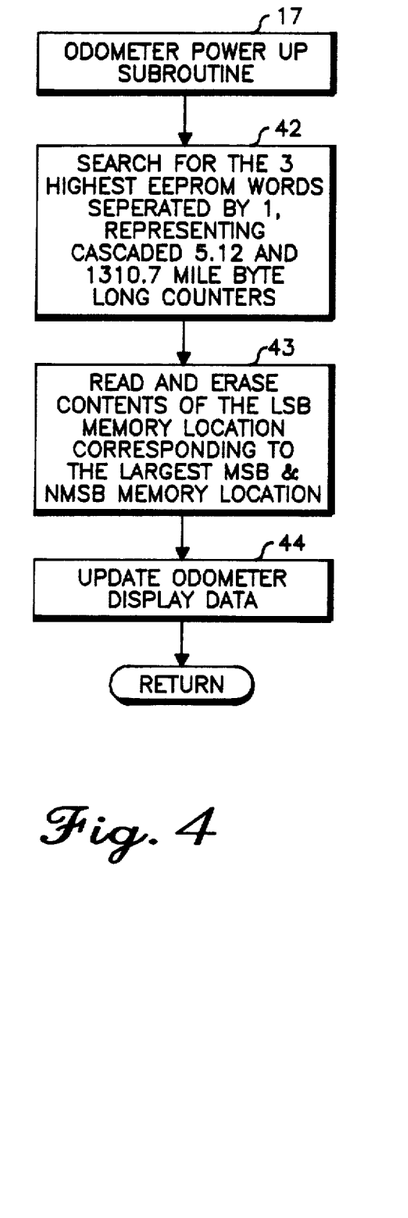
FIG. 4 comprises a flow-chart depiction.

Referring to FIG. 4, and following the incrementation, a determination will then be made as to whether any unoccupied or untried memory locations in the first plurality of memory locations exist (33). The first time through this decision node, the system simply moves to the next most significant bits information memory location (11) that would follow in sequence the memory location holding the largest value as prescribed by the pre-established closed-loop sequence. Presuming that some memory locations are left, the system will locate it pursuant to the pre-established sequence and erase its contents (34).

Following this, the system will fill the designated memory location with a 16 bit data entry reflecting the most significant bits and next most significant bits data as incremented above (36). Following this, a determination will be made as to whether the updated information has been successfully stored in the designated memory location (37). This will be done by immediately reading the memory location and comparing the information contained in it with the calculated odometer reading. If a match occurs, then the presumption can be made that the information has been successfully stored and the system proceeds to update the odometer display to reflect the incrementation (38) and then returns to the normal mode (19) (FIG. 2).

If, however, a successful write does not occur, then the attempted memory location will be temporarily masked (39) and the system will loop back to again determine whether any unoccupied or untried memory locations are left (33). If such locations remain, then the system will proceed again as described above. Otherwise, an an error signal will be displayed to the operator (41) and the system will return to the normal mode (19) (FIG. 2).

Referring to FIG. 4, the odometer power up sub-routine (17) briefly mentioned above with respect to FIG. 2 will now be described. During initial power-up, the system will search for the three largest most significant bits memory locations that are separated by increments of one (42). When these have been located and the largest value has been identified, the contents of the least significant bits memory location (12) as located in the second plurality of memory locations and as associated with that largest most significant bits memory location (11) will be read into volatile memory and then erased (43).

Following this, the odometer display can be updated and the current odometer reading displayed (44). The sub-routine (17) then returns to the start-up software routine as depicted in FIG. 2.

Figure 5:
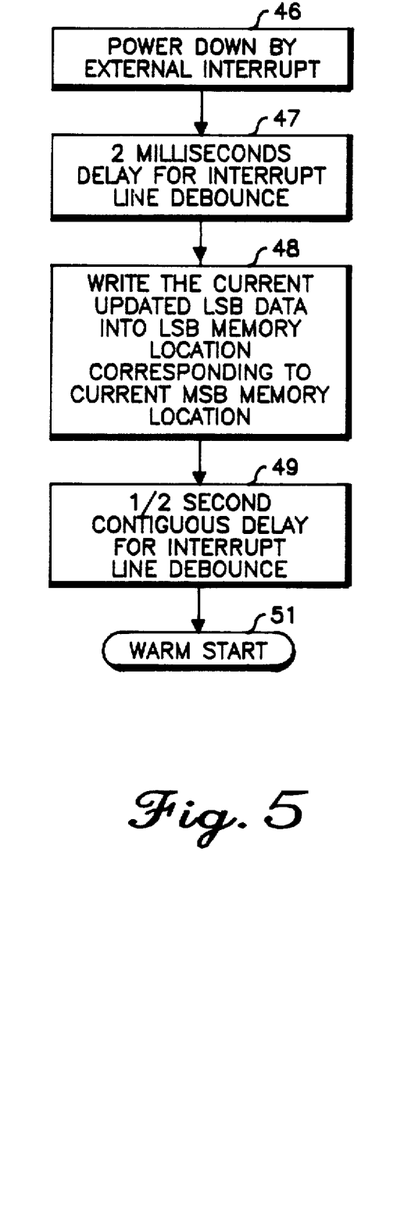
FIG. 5 comprises a flow-chart depiction.

Referring to FIG. 5, a power down sub-routine by external interrupt (46) will now be described. When power down conditions are sensed in accordance with well known prior art techniques, an external interrupt occurs and a 2 millisecond delay for interrupt line debouncing is provided (47). The currently updated least significant bits information as contained in volatile memory will then be written into a memory location (12) in the least significant bits memory location corresponding to the current most significant bits memory location (11) (48). Following this, a one-half second contiguous delay for interrupt line debouncing will be provided (49). Presuming then that a true power down situation exists, the system will cease operating and all data regarding the odometer will be safely stored in the non-volatile memory. If, however, a true power down situation does not occur, then a warm start (51) condition can be presumed and the program will return to the initializing program as depicted in FIG. 2.

In order to ensure the provision of a complete and accurate disclosure as regards the best mode for carrying out this invention, an appendix has been attached to this specification that details the exact computer program that, when programmed into an MC6805R3 microprocessor and associated with the COP494E EEPROM, will perform the sub-routine functions and memory storage features described above.

Through provision of this non-volatile memory storage system, regular and frequent updates to the odometer reading are accomplished, assuring accurate gathering of data. By the same token, this system provides for a frugal resort to non-volatile memory, such that only the larger incremental bits need be provided on a regular basis (approximately every 5 miles) and the smaller bits need only be entered during power down occurrences. Both such situations require far fewer anticipated occurrences over the anticipated lifetime of an automobile than the anticipated lifetime of each memory location in the non-volatile memory. Furthermore, due to the apportioned sequential nature of storing such information in non-volatile memory, such wear and tear can be evenly divided between all memory locations, again enhancing lifetime probabilities.

Various changes and modifications to this embodiment will be obvious to those skilled in the art. For instance, this system would have applicability in areas other than automobile odometers, and has particular applicability in any setting where storage of a large quantity of incrementally increasing data must be maintained in a setting where electrical power runs a risk of failure or down time. Such changes and modifications are not to be considered as outside the scope of the claims unless specifically limited thereby.

What is claimed is:

1. A method of storing a count of incrementally increasing data in non-volatile memory, comprising the steps of:
   (a) providing at least one non-volatile memory location;
   (b) providing at least one other memory location;
   (c) monitoring for a power down condition;
   (d) storing updated counts in said other memory location as said count incrementally increases;
   (e) upon detecting a power down condition, storing at least a part of said count in said non-volatile memory location in at least duplicate.

2. The method of claim 1 wherein a plurality of non-voltatile memory locations are provided.

3. The method of claim 1 wherein said other memory location comprises a volatile memory location.

4. The method of claim 1 and further including the steps of:
   (a) reading said duplicate stored counts;
   (b) comparing said duplicate stored counts with one another;
   (c) accepting said duplicate stored count as having being validly stored if there is no difference therebetween;
   (d) averaging said two duplicate stored counts if they are different and accepting the average as a valid count.

5. The method of claim 1 and further including the steps of:
   (a) upon concluding said power down condition reading said count as stored in said non-volatile memory location;
   (b) storing said read count in said other memory location.

6. A method of storing a count of incrementally increasing data in non-volatile memory, comprising the steps of:
   (a) providing at least one first non-volatile memory location;
   (b) providing at least one second non-volatile memory location;
   (c) providing at least one volatile memory location;
   (d) monitoring for a power down condition;
   (e) storing least significant bits information regarding said count in said volatile memory location as said count incrementally increases;
   (f) storing most significant bits information regarding said count in said first non-volatile memory location as said count incrementally increases;
   (g) repeating from step e unless a power down condition is sensed, in which case proceed to the following steps;
   (h) storing said least significant bits information regarding said count in said second non-volatile memory location.

7. The method of claim 6 wherein a plurality of first non-volatile memory locations are provided.

8. The method of claim 6 wherein a plurality of second non-volatile memory locations are provided.

9. The method of claim 6 wherein said least significant bits information is stored in said second non-volatile memory location in at least duplicate.

10. The method of claim 9 and further including the steps of:
    (a) reading said duplicate stored least significant bits information;
    (b) comparing said duplicate stored least significant bits information with one another;
    (c) accepting said duplicate stored least significant bits information as having been validly stored if there is no difference therebetween.

11. The method of claim 10 and further icluding the step of averaging said duplicate stored least significant bits information if they are different and accepting the average as being a valid recordation of said least significant bits data.

12. A method of storing odometer information for a vehicle to maintain a record of distance traveled by said vehicle, comprising the steps of:
    (a) providing a series of pulses proportional to said distance being traveled by said vehicle;
    (b) providing a first plurality of non-volatile memory locations;

(c) providing a second plurality of non-volatile memory locations;
(d) providing at least one volatile memory location;
(e) monitoring for a power down condition;
(f) incrementally increasing a count of said pulses as said pulses are received, said count being comprised of least significant bits information and most significant bits information;
(g) storing said least significant bits information in said volatile memory location;
(h) storing said most significant bits information in said first plurality of non-volatile memory locations;
(i) repeating from step f unless a power down condition is sensed, in which case proceed to the following steps;
(j) storing said least significant bits information in said second plurality of non-volatile memory locations.

13. A method of storing a count of incrementally increasing data in non-volatile memory, comprising the steps of:
(a) providing at least one non-volatile memory location;
(b) providing at least one other memory location;
(c) monitoring for a power down condition;
(d) storing updated counts in said other memory location as said count incrementally increases;
(e) upon detecting a power down condition, storing at least a part of said count in said non-volatile memory location;
(f) upon concluding said power down condition, reading said count as stored in said non-volatile memory location;
(g) storing said read count in said other memory location;
(h) erasing said non-volatile memory location.

* * * * *